May 17, 1932. W. L. MEGGS 1,859,149
COMBINATION BALL BEARING STEERING KNUCKLE
Filed Oct. 15, 1930
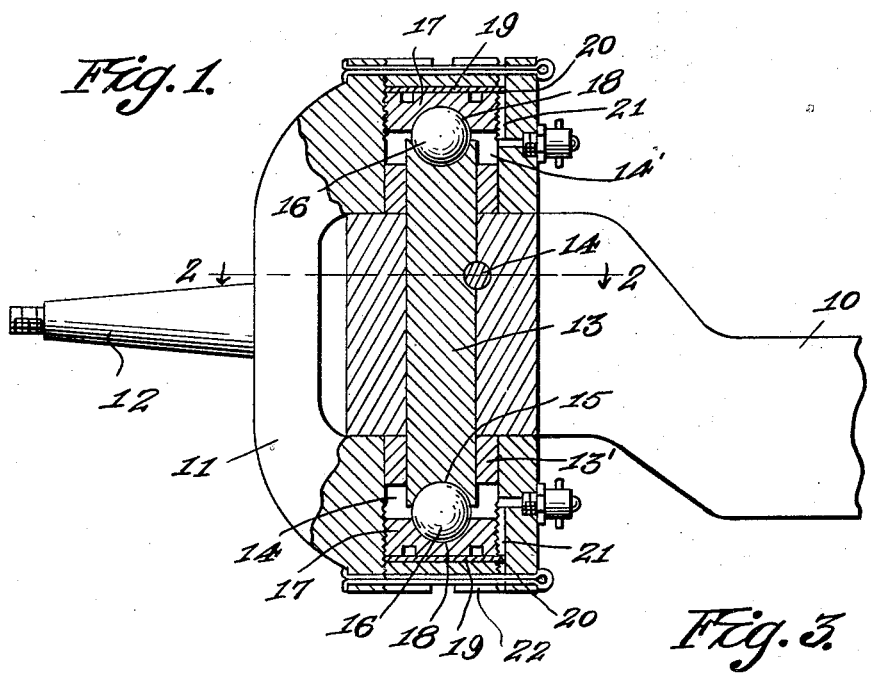
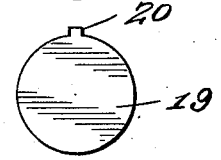
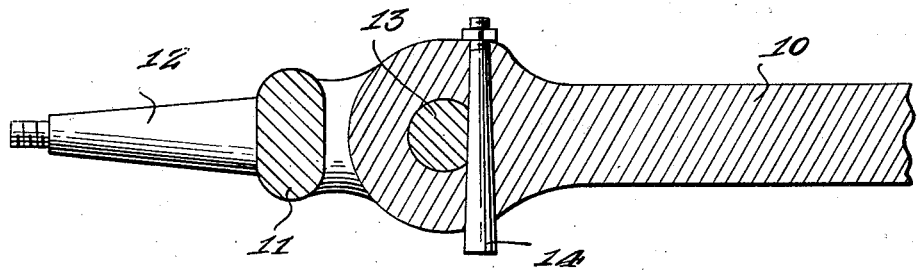

Patented May 17, 1932

1,859,149

UNITED STATES PATENT OFFICE

WILLIAM L. MEGGS, OF JACKSONVILLE, FLORIDA

COMBINATION BALL BEARING STEERING KNUCKLE

Application filed October 15, 1930. Serial No. 488,950.

This invention relates to certain new and useful improvements in stub axle constructions and more particularly to the mountings therefor.

One of the principal objects of the invention consists of ball bearing supports for the journals of the stub axles.

Another object of the invention contemplates the provision and arrangement of adjusting elements for the ball bearings with relation to the journals.

With the above and other objects in view, the invention further consists of the following novel features and details of construction, to be hereinafter more fully described, illustrated in the accompanying drawings and pointed out in the appended claim.

In the drawings:—

Figure 1 is a longitudinal sectional view taken through the improved form of stub axle and journal therefor.

Figure 2 is a horizontal sectional view taken on line 2—2 of Figure 1.

Figure 3 is a plan view of a spacing element for the several adjusting means.

Referring to the drawings in detail wherein like characters of reference denote corresponding parts, the reference character 10 indicates generally the front or steering axle of a motor vehicle having the yoke portion 11 of a steering wheel stub axle 12 associated therewith in the ordinary manner. The king bolt 13 is retained against movement in the ordinary manner through the employment of a tapered pin 14.

All of the above is of the usual and well known construction, followed by present day motor vehicle manufacturers and which forms no part of the present application for Letters Patent but is mentioned merely for purposes of illustration in bringing forward the novel advantages of the present invention.

Those portions of the king bolt 13 projecting outwardly and beyond the passages especially provided for the purpose in the steering axle 10 are projected through bushings 13, wholly disposed within the pockets 14 in the extremities of the yoke portions 11. The extremities of each of the respective king pins or bolts are cupped, as at 15, to snugly accommodate appropriate portions of ball bearings 16; only two being required for each stub axle journal assemblage. Adjusting elements 17, threadedly mounted within each of the pockets 14, are also provided with cup-shaped portions 18 after the manner of the extremities of the king bolts or pins to accommodate other portions of the ball bearings 16.

From the foregoing, it is understood that the bushings 13 will serve as guides for the projecting portions of the king bolts or pins and the ball bearings 16 will withstand all of the bearing pressure inasmuch as the yoke portions of the stub shaft are to be shifted therefrom. Spacing washers 19, arranged within each of the pockets 14 behind the adjusting elements 17, are provided with tongues or ears 20 projecting within raceways or slots 21 in the side walls of the pockets 14 whereby the locking elements 22 when screwed home to retain the assemblage against displacement from adjusted position will be incapable of altering such adjustment inasmuch as the spacing washers 19 are not free to turn therewith.

Any suitable or preferred type of pressure lubricant fitting may be employed upon the yoke portions 11 to fill the respective pockets 14 whereby the ball bearings 16 will permit the stub shafts and wheels therefor to turn with comparative ease.

Although I have shown and described the invention as being particularly applicable for use upon steering axle stub shafts for motor vehicles, it is obviously apparent that the bearing structure may be employed to equal effect in other places where a journal of this character is desired.

The invention is susceptible of various changes in its form, proportions and minor details of construction and the right is herein reserved to make such changes as properly fall within the scope of the appended claim.

Having described the invention, what is claimed is:

An axle mounting comprising a bolt provided at its ends with sockets, balls located in the sockets, bushings surrounding the end portions of the bolt, a yoke having pockets receiving the bushings, the end portions of the bolt and the balls, plugs threaded in the pockets and bearing against the balls, the pockets having channels at the sides of the plugs, washers bearing against the plugs and having portions entering the channels, and locking elements screwed into the pockets and bearing against the washers.

In testimony whereof I affix my signature.

WILLIAM L. MEGGS.